J. GODDARD & W. S. HUTCHINGS.
FASTENER FOR CAMERA BACKS.
APPLICATION FILED JUNE 22, 1914.

1,151,781. Patented Aug. 31, 1915.

Witnesses:
Clarence W. Carroll
D. Gurnee

Inventor:
Joseph Goddard
William S. Hutchings
by their attorneys
Davis & Dolsey

UNITED STATES PATENT OFFICE.

JOSEPH GODDARD AND WILLIAM S. HUTCHINGS, OF ROCHESTER, NEW YORK, ASSIGNORS TO SENECA CAMERA MANUFACTURING COMPANY, OF ROCHESTER, NEW YORK, A CORPORATION OF NEW YORK.

FASTENER FOR CAMERA-BACKS.

1,151,781.              Specification of Letters Patent.      Patented Aug. 31, 1915.

Application filed June 22, 1914. Serial No. 846,562.

*To all whom it may concern:*

Be it known that we, JOSEPH GODDARD and WILLIAM S. HUTCHINGS, citizens of the United States, and residents of Rochester, in the county of Monroe and State of New York, have invented certain new and useful Improvements in Fasteners for Camera-Backs, of which the following is a specification.

This invention relates to roll-holding cameras of the type in which the casing of the camera is closed by a removable back.

The object of the invention is to provide simple and convenient means for fastening the camera-back in place, and for manipulating the back when removing it from the casing and particularly to provide means for this purpose which shall be compact in form, and shall be, as nearly as possible, housed and concealed within or between the casing and the back, when the back is in its normal position.

To the foregoing ends the invention consists in the construction hereinafter described, as it is defined in the succeeding claims.

Figure 1:
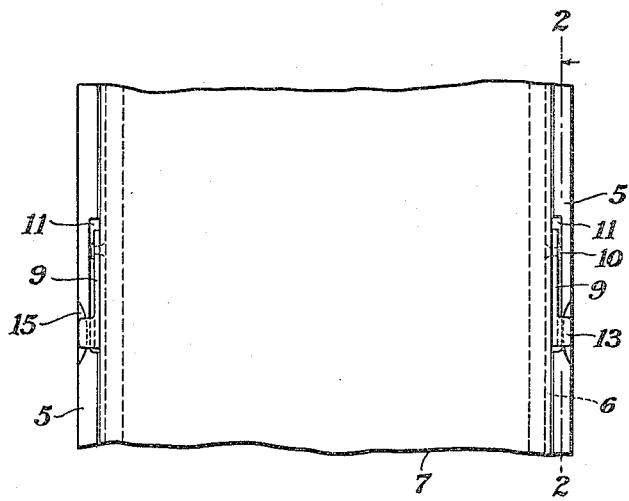
Figure 3:
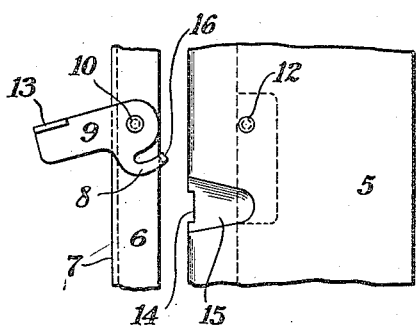
Figure 2:
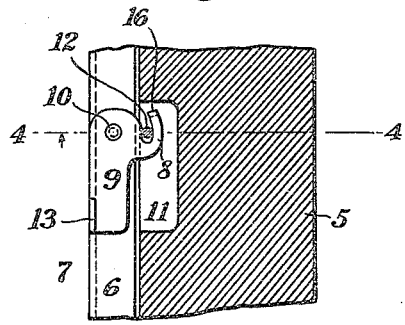
Figure 4:
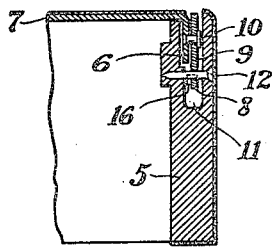

In the accompanying drawings:—Figure 1 is a rear-elevation of a portion of a roll-holding camera embodying the present invention, with the parts in normal position; Fig. 2 is a section on the line 2—2 in Fig. 1; Fig. 3 is a side-elevation, showing the catches in inoperative position, and the back removed from the body of the casing; and Fig. 4 is a section on the line 4—4 in Fig. 2.

The invention is shown as employed in connection with a roll-holding camera of a well-known type, having a casing comprising the usual wooden side-walls 5, these side-walls being slotted to receive inwardly-bent flanges 6 at the lateral edges of the removable sheet-metal back 7 by which a light-tight closure for the film-chambers of the camera is provided.

In a camera of the type in question the removable back is usually fixed in place by catches connecting it with the side-walls 5 at points mid-way from its ends, and we have shown our invention as comprising catches located at these points. As shown in Figs. 2 and 3, each catch is formed of sheet-metal cut and bent to provide a hook 8 and an arm 9, and the catch is mounted, by means of a pivot 10, on the outer surface of one of the flanges on the back 7. The catch is normally housed within a recess 11 formed in the side-member 5 adjacent the slot which receives the flange 6, and to coöperate with the hook 8 we employ a detent-member in the form of a pin 12 fixed in the side-member, this pin extending across thse recess 11. In order that the arm 9 may be manipulated to engage the hook with, or disengage it from, the pin 12, the arm is provided with an outwardly-bent lug 13, which is normally seated in a notch 14 in the side-wall 5, and to avoid the necessity of extending this lug beyond the general surface of the side-wall the wall is provided with a depression 15, adjacent the notch 14, to permit the lug 13 to be conveniently grasped by the thumb or finger.

The catch is provided with a second lug 16, at the extremity of the hook 8, this lug being bent inwardly so that it engages the edge of the flange 6 when the hook has been swung to its extreme inoperative position, as shown in Fig. 3. This lug thus acts to arrest the catch in a position in which the arm 9 projects rearwardly from the back, so that it may be conveniently employed as a handle by which the back may be manipulated, in removing it from and returning it to operative position.

It will be apparent that when the back is in its normal position, with the catches in operation, the catches are substantially housed within and concealed by the casing of the camera, and that they do not project beyond the general surface of the casing at any point. When the back is to be removed, however, the two lugs 13 are engaged by a thumb and finger and drawn rearwardly, thus swinging the hooks out of engagement with the pins 12, whereupon the back may be pulled away from the body of the casing, using the catches as handles for this purpose.

While we have described our novel construction as employed and particularly useful in a roll-holding camera, it will be apparent that it may be used for other purposes wherever a casing and a closure of the same character are to be detachably secured together.

We claim:—

1. In a camera or the like, the combination, with a closure having a marginal flange, and a casing-wall slotted to receive said flange, of a catch pivoted to the outer surface of said flange and comprising a hook and a manually-operable arm; and a detent fixed in the slot in the casing-wall and adapted to coöperate with said hook; the casing-wall being recessed alongside the slot and the catch being normally housed in the recess except for a portion of said arm which extends laterally, toward the outer surface of the wall, into a position in which it is manually accessible.

2. In a camera or the like, the combination, with a closure having a marginal flange, and a casing-wall slotted to receive said flange, of a catch pivoted on the outer surface of said flange and comprising a hook and an arm adapted to lie flat against the flange, and an outwardly bent lug at the end of the arm; and a detent fixed in the slot in the casing-wall in position to coöperate with the hook.

3. In a camera or the like, the combination, with a closure having a marginal flange, and a casing-wall slotted to receive said flange, of a catch pivoted on the outer surface of said flange and comprising a hook and an arm adapted to lie flat against the flange, and an outwardly bent lug at the end of the arm; and a detent fixed in the slot in the casing-wall in position to coöperate with the hook, the hook being provided with a laterally-projecting lug adapted to engage the edge of the flange and arrest the swinging movement of the arm when it reaches an outwardly-projecting position with the hook in inoperative position.

4. In a camera or the like, the combination of a closure having a marginal flange; a catch pivoted upon the outer surface of the flange and comprising a hook and an arm adapted to lie flat against the flange, and a lug extending outwardly from the end of the arm; a casing-wall having a slot, to receive said flange, a recess, alongside the slot, to receive the body of the catch, and a notch, in its rear edge, to receive said lug; and a detent-member fixed in said recess in position to coöperate with the hook to retain the closure in place.

5. In a camera, or the like, the combination, with a closure having a marginal flange, and a casing-wall recessed to receive said flange, of an arm pivoted to the outside of said flange and movable into a position in which it lies along the flange and is housed in the recess in the casing-wall, and into a position in which it extends outwardly from the closure so that it may be used as a handle to manipulate the latter.

6. In a camera, or the like, the combination of a closure, a handle attached to the closure and movable, thereon, into and out of a position in which it projects from the rear of the closure so as to be accessible for use in manipulating the closure; and a casing, with which the closure coöperates, provided with a recess to receive the handle when it is in its inoperative position on the closure.

7. In a camera, or the like, the combination, with a closure having a marginal flange, and a casing-wall recessed to receive said flange, and provided with a depression on its outer surface at its rear margin, of an arm pivoted to the outside of said flange and movable into a position in which it lies along the flange and is housed in the recess in the casing-wall, and into a position in which it extends outwardly from the closure so that it may be used as a handle to manipulate the latter, said arm having a laterally-projecting lug which registers with said depression when the arm is in its first-mentioned position.

In testimony whereof, we affix our signatures in the presence of two witnesses.

JOSEPH GODDARD.
WILLIAM S. HUTCHINGS.

Witnesses:
J. A. DYER,
N. E. FISHELL.

Copies of this patent may be obtained for five cents each, by addressing the "Commissioner of Patents, Washington, D. C."